Feb. 14, 1939.  C. A. LONG  2,147,048
LIQUID MEASURING DEVICE
Filed June 29, 1937  2 Sheets-Sheet 1

INVENTOR
Charles A. Long
by his attorneys
Stebbins, Blenko & Parmelee

Feb. 14, 1939.   C. A. LONG   2,147,048
LIQUID MEASURING DEVICE
Filed June 29, 1937   2 Sheets-Sheet 2

INVENTOR
Charles A. Long
by his attorneys
Stebbins, Blenko & Parmelee

Patented Feb. 14, 1939

2,147,048

UNITED STATES PATENT OFFICE 2,147,048

LIQUID MEASURING DEVICE

Charles A. Long, Oakmont, Pa., assignor to Blaw-Knox Company, Pittsburgh, Pa., a corporation of New Jersey Application June 29, 1937, Serial No. 150,898

5 Claims. (Cl. 221—95)

This invention relates to an apparatus and method for measuring liquid. A specific application, in connection with which the invention will be illustrated and described in detail, is the measurement of water for mixing batches of concrete, although the invention has other applications.

In the mixing and handling of concrete, so-called "truck mixers" have come into wide use. With such equipment, the dry materials to be mixed are stored at a central point and measured into the mixer. The truck on which the mixer is mounted is then driven to the point where the concrete is to be delivered. The dry materials are mixed with water enroute, but since the length of the trip only rarely corresponds precisely to the optimum mixing time, the water must be added to the dry materials at some point between the beginning and end of the trip. The amount of water must, of course, be accurately measured. The proper amount of water may be measured by filling a storage tank to a predetermined level and discharging all the water into the mixer at the proper time. If this is done, however, a separate tank must be provided for carrying water to wash out the mixer when it has discharged its contents. This is undesirable from the standpoint of cost and complexity of construction.

It is an object of this invention to provide means for accurately measuring a quantity of liquid from a body thereof while being transported, with such accuracy as is normally required in mixing concrete. This accuracy, of course, can not be obtained by running water out of a tank until it falls to a predetermined level, because of the disturbance of the surface of the water resulting from the movement of the truck.

In accordance with my invention, I provide a weir chamber mounted for movement vertically of a water storage tank. A hose connects one end of the chamber to a discharge outlet, while a second hose connects the other end to a point adjacent the bottom of the tank. By lowering the weir chamber to a level below that of the water, water will flow out the discharge outlet when it is opened until the water level falls below the top of the weir in the chamber. The inertia of the water columns in the hoses prevents any disturbance on the surface of the water from affecting the accuracy of measurement. A vent is provided in the weir chamber to avoid siphoning.

A complete understanding of the invention may be obtained from the following detailed description which is to be read in connection with the accompanying drawings illustrating a present preferred embodiment. In the drawings, Fig. 1 is a plan view of the invention mounted in a water tank disposed adjacent a truck mixer;

Figure 1:
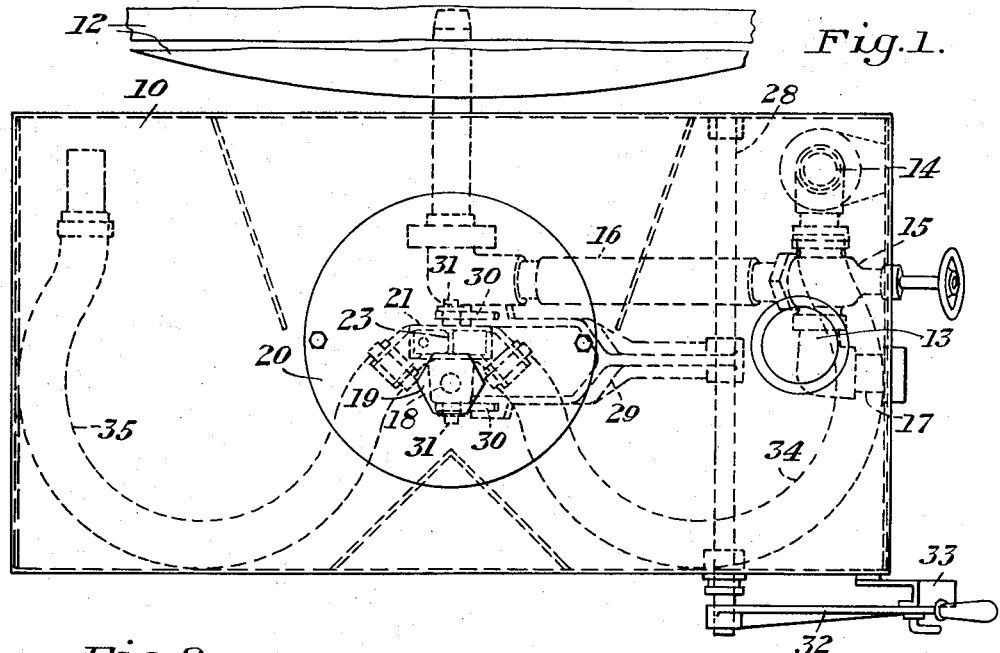

Referring now in detail to the drawings, a water storage tank 10 is supported on a framework 11, of any suitable character, in a position adjacent a truck mounted mixer, a portion of which is indicated at 12. The top of the tank is provided with a filling opening 13 and a discharge outlet 14. The outlet is provided with a valve 15 from which a connection 16 extends into the mixer 12. A branch connection from the valve provides a capped blowout connection 17.

A slide rod 18 is mounted vertically in the tank 10 in a position substantially centrally thereof. The upper end of the rod 18 is seated in a recess in a cap 19 secured to a plate 20 removably attached to the top of the tank. The lower end of the rod is seated in a hole in a plate attached to the bottom of the tank.

Figure 3:
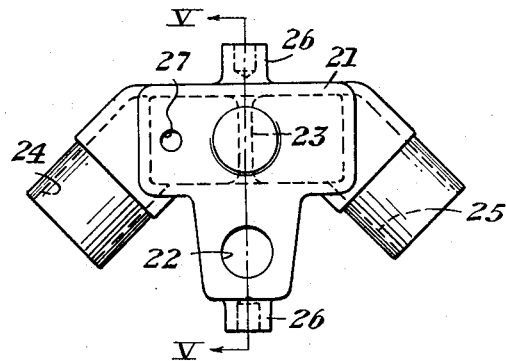
Fig. 3 is a plan view of the weir chamber.
Figure 4:
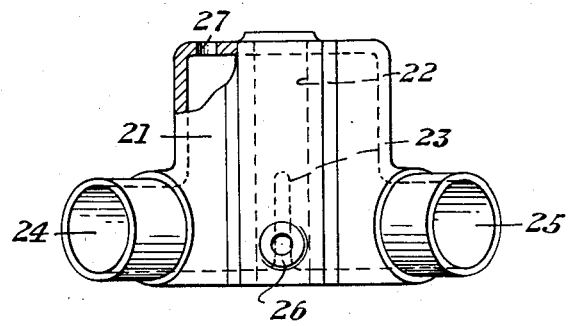
Fig. 4 is an elevation thereof.
Figure 5:
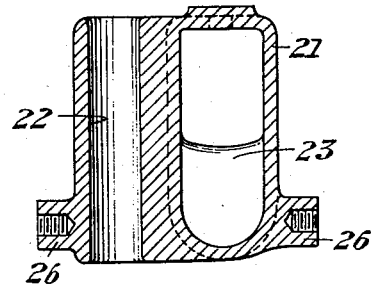
Fig. 5 is a transverse sectional view therethrough along the line V—V of Fig. 3.

A weir chamber 21 shown more clearly in Figs. 3 through 5 is bored, as at 22, so as to be slidable on the rod 18. The chamber 21 has a weir 23 extending upwardly therefrom. The chamber has ports 24 and 25 extending therefrom on opposite sides of the weir. Bosses 26 are tapped for trunnion bolts. The top wall of the chamber is provided with a vent 27.

Figure 2:
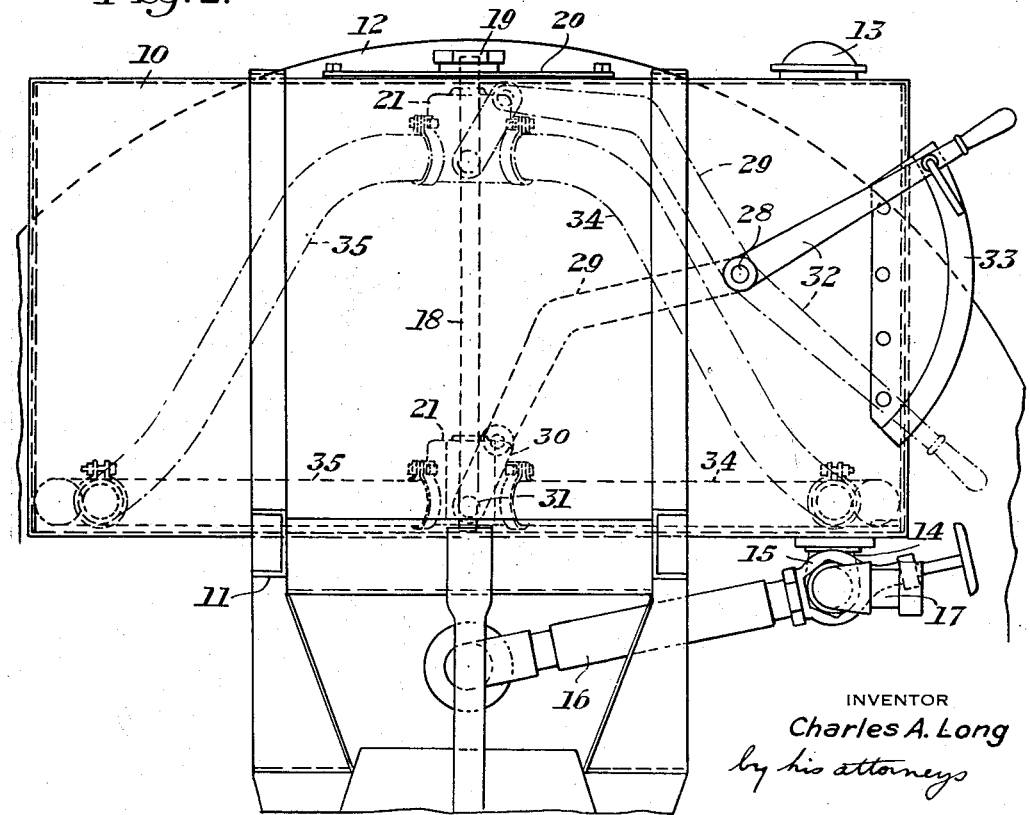
Fig. 2 is a side elevation thereof.

As shown in Figs. 1 and 2, the weir chamber is slidable on the rod 18. I also provide means for reciprocating the chamber along the rod. Such means include a shaft 28 extending transversely of the tank toward one side thereof, being journaled in suitable bearings carried by the tank walls. A fork 29 is secured to the shaft 28. Links 30 are pivoted to the prongs of the fork and to trunnion bolts 31 threaded in the bosses 26. The shaft 28 extends through one wall of the tank, and the protruding end is provided with a lever 32. The tank carries an arcuate guide 33 for the lever whereby the latter may be fixed at any desired position. When the lever is pulled down, of course, the weir chamber 21 is raised simultaneously.

A hose connection 34 extends from the port 25 of the weir chamber to the discharge outlet 14.

A hose connection 35 extends from the port 24 of the weir chamber to the bottom of the tank, the end of the hose 35 being open.

In using the invention, the tank 10 is filled at the start of the trip, conveniently while the dry materials are being charged into the mixer. The valve 15, of course, is closed during these operations. When the tank and mixer have been charged, the lever 32 is adjusted to a predetermined position relative to the guide 33 and secured thereat. The truck on which the mixer and tank are mounted is then started on its journey toward the point where the concrete is to be delivered. When the truck is within a predetermined distance of its destination, the driver opens the valve 15, simultaneously starting the drive for the mixer. The precise amount of water required is thus admitted to the mixer and the concrete is fully mixed by the time it arrives at the point of delivery.

It will be understood that when the weir chamber is below the level of the water in the tank 10, there is a net head of water tending to cause a flow through the hose connection 35, the chamber 21 and the hose connection 34, which head is equal to the distance between the top of the weir 23 and the mean level of the water in the tank. Thus, so long as the mean water level in the tank is above the top of the weir, water will flow from the outlet when the valve 15 is opened. As soon as the mean level in the tank falls below the top of the weir 23, no more water will be discharged. Siphoning is prevented because the vent 27 breaks any vacuum which might form in the line. The inertia of the water columns in the hose connections prevents any disturbance that may exist on the surface of the water from affecting the amount of water discharged and, even though the truck is traversing a rough road so that the surface of the water is violently agitated, an excess of water will not slop over the top of the weir. When the concrete has been discharged, a portion of the water remaining in the tank may be employed for washout purposes by lowering the weir.

It will be apparent from the foregoing description that the invention provides a simple, relatively inexpensive, yet highly effective means for insuring that the proper amount of water for a batch of concrete will be delivered to the dry materials, during the progress of the mixer, even though the latter is subject to considerable vibration and shock, without completely emptying the tank. The provision of an extra tank for washout water is thus avoided.

Although I have illustrated and described but a preferred embodiment of the invention, it will be understood that changes in the practice and construction disclosed may be made without departing from the spirit of the invention or the scope of the appended claims.

I claim:

1. Apparatus for dispensing a predetermined quantity of liquid comprising a container for the liquid, a conduit immersed in the liquid in the container, one end of the conduit being connected to a discharge port, the other end being adapted to receive liquid from the container, said conduit including a chamber having a weir extending thereacross, and a substantially closed upper portion to prevent surface agitation of the liquid from affecting flow of said liquid over the weir in the chamber, and means mounting said chamber in said container for movement to various depths therein.

2. Measuring apparatus for a liquid storage tank having a discharge outlet, said apparatus comprising a conduit connected to said outlet and having its free end immersed in the liquid, a substantially closed chamber connected in said conduit and mounted for submergence to various depths in said liquid, and a weir extending across said chamber effective to control the flow of liquid through said conduit unaffected by surface agitation.

3. Apparatus for delivering a predetermined amount of liquid from a storage tank comprising a substantially closed chamber movable vertically in the tank, a conduit connected to one side of the chamber and extending to a discharge port, and a conduit connected to the other side of the chamber and having its free end immersed in the liquid, and a weir extending across said chamber effective to control the flow of liquid through said conduit unaffected by surface agitation.

4. In a liquid measuring apparatus, a substantially closed chamber mounted for movement upwardly and downwardly in a storage tank, said chamber having a weir extending thereacross, a connection from the chamber on one side of the weir to a discharge port, and a connection from the chamber on the other side of the weir to the lower part of the tank.

5. The combination with a liquid storage tank of a guide rod therein, a chamber adapted to move up and down along said rod, a weir extending across said chamber, a conduit extending from one side of the weir in said chamber to a discharge port and a conduit extending from the other side of the weir substantially to the bottom of the tank.

CHARLES A. LONG.